Figure 1:
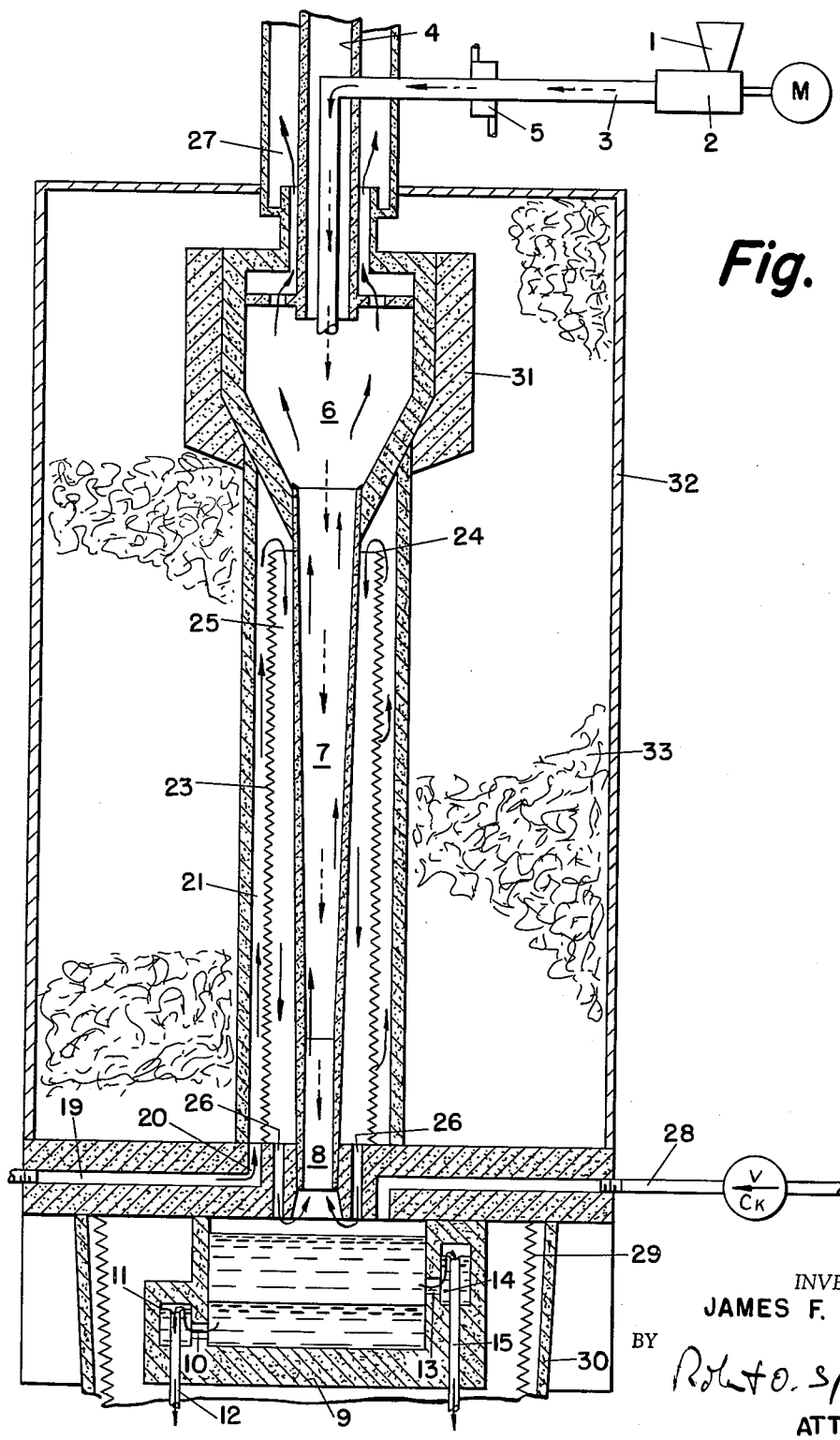

June 4, 1963　　　　　J. F. EDNIE　　　　　3,092,490
PROCESS AND APPARATUS FOR THE REDUCTION OF IRON ORE
Filed Jan. 30, 1961　　　　　　　　　　　　2 Sheets-Sheet 2

INVENTOR.
JAMES F. EDNIE
BY Robert O. Spindle
ATTORNEY

United States Patent Office 3,092,490
Patented June 4, 1963

3,092,490
PROCESS AND APPARATUS FOR THE REDUCTION OF IRON ORE
James F. Ednie, Newtown Square, Pa., assignor to Sun Oil Company, Philadelphia, Pa., a corporation of New Jersey
Filed Jan. 30, 1961, Ser. No. 85,736
7 Claims. (Cl. 75—26)

This invention relates to an improved process and apparatus for the reduction of iron ore at high temperature in a tapered graphite reduction tube.

The fundamental objective in all iron ore reduction processes is to bring the metallic oxide into intimate relative contact with a suitable reducing medium at an optimum temperature in an economical and efficient manner. In the United States, up to the present time, only one process has met these basic requirements, since all commercial production of liquid iron by reduction is from blast furnaces.

One prior art concept of reduction involves the use of a fluidized bed. According to this process, a mass or bed of ore is subjected to the action of an upwardly flowing gas so that the bed of ore particles takes on the characteristics of a liquid. It may be made to boil and to flow through pipes in a turbulent state. The chief limitation of this technique is that temperatures must be maintained in the range of from 1,000 to about 1,800° F. This results in slow reduction rates and temperature-sensitive operation. If a temperature upset occurs, the dense phase quickly transforms into a sticky, semi-fused mass which agglomerates on the bed base and chokes gas flow—collapsing the fluidized bed.

Another prior art process utilizes free-fall of a shower of ore in a shaft-type furnace countercurrent to the upward flow of reducing gas. The disadvantage of this method of contacting is that part of the ore is not in contact with the reducing gas long enough for complete reduction and a large quantity of unreduced ore must be disposed of.

The object of this invention is to integrate into a single process an operational accommodation of all the requirements for economical and effective reduction of iron ore including high temperature, highly reactive reducing gas, which maintains its potency due to regeneration, maximum ore particle contact, continuous ore feed, continuous and self-regulating removal of reduced metal and slag from the reduction chamber and complete reduction of the ore.

A more specific object of the present invention is to support the ore particles in the reducing medium until each particle is completely reduced.

Another object of the invention is to control the velocity of the reducing gas in various sections of the reducing zone by means of a particularly shaped tube.

Another objective is to maintain continuous regeneration of the reductant gas within the reactor by careful control of methane and free carbon constituents in the reactor.

These and additional objects and advantages of the invention will be apparent from the description which follows.

In accordance with this invention, pulverized ore is continuously fed into the upper or disengager zone of a vertical tapered reduction tube made of graphite. As the ore passes downwardly into the tapered portion of the tube, lighter particles are supported in oscillating suspension by reducing gas flowing counter-currently up the tube. Heavier ore particles seek their level in the tapered tube as they move downward into the narrower sections of the tube where gas velocity and lifting action is greater. The velocity of the reducing gas is adjusted to hold the larger ore particles in oscillating suspension near the bottom of the tapered reduction tube. Thus, the entire reduction tube is filled with ore particles suspended in the reducing gas. The temperature in the tube is maintained at about 2,800° F. Reduction takes place in a matter of seconds in this environment. Reduction to metal increase the density of particles and agglomeration promotes the formation of metal and slag globules which the gas cannot support. The globules descend down out of the tube into a sealed, heated crucible. In the crucible, clean-up reduction is accomplished, also slag fluxing and separation of the liquid iron and slag into layers, which discharge by "underpouring" as separate streams.

A most important feature of the invention is the concept of self-regulation. Each particle of iron ore independently remains in suspension as long as necessary for reduction. The metal automatically withdraws itself from the reducing column under the influences of the increase in density resulting from the conversion of ore to metal and of agglomeration of the metal particles into globules. Agglomeration lags behind reduction so the agglomerating globule is always essentially metal.

The iron ore treated in the process is selected on the basis of a high iron content. Hematite containing over 50% iron is a suitable ore feed. Low grade ores may be used but with less efficiency due to the high slag levels and the necessity of having facilities for removing non-metallic dust from the off gas. It is contemplated that beneficiated low grade ores may be used. Ore particles range from 20 mesh to 325 mesh. A suitable particle distribution range is as follows: 20–60 mesh—23.6%; 61–200 mesh—67.8%; and 201–325 mesh—8.6%. A small amount of dust will always be present. The ore is thoroughly dried before use. A typical Venezuelan ore has a density of about 5.1. Upon reduction to iron containing about 4% carbon, the density increases to about 7.75, an increase of from about 40 to about 50%.

The ore may be preheated by any suitable means before it is charged to the reduction zone.

The reduction tube is made of graphite. Conventional refractory materials such as fire clay, magnesite, alumina, and quartz are unsuitable because of reactivity with the materials undergoing reduction and the reductant gases at reaction temperatures. The dimensions of the tube vary according to the through-put and the velocity of the reducing gas. The ratio of minimum bore diameter to maximum bore diameter is from 1.0 to 1.1 to 1.0 to 4.0. The ratio of length to minimum bore is from 1 to 25 to 1 to 300.

A Venezuelan ore having the particle distribution shown above exhibited satisfactory suspension and uniform distribution throughout a vertical column 8 ft. long, having a maximum diameter at the base of the disengaging zone of 2.75 inches and tapering down to 0.75 inch at the base. The gas inlet tube at the base was 0.75 inch in diameter and 12.0 inches in length. With the gas rate at 4.0 cubic feet per minute, the safe ore load (without slugging) was 50 grams at 2.5 inches water pressure drop. At a gas rate of 6.0 cubic feet per minute, the safe ore load was 225 grams at 10.0 inches of water pressure. Those skilled in the art may correlate ore specifications, tube dimensions and reducing gas rate for any size unit.

An important aspect of the invention is the use of a multiplicity of reduction tubes in a single insulated shell. From 3 to 20 tubes may be incorporated into a single reduction unit. This method of operation results in greater all around efficiency.

A number of reducing gases may be used including hydrogen, carbon monoxide, methane, natural gas and other hydrocarbons as well as mixtures of these. The reducing gas may be prepared by treating methane or natural gas to produce hydrogen and carbon monoxide.

An excess of free carbon in the reactor is always maintained by any one of several methods, such as adding free carbon or carbonaceous material with the ore or into the disengager, and also by maintaining an excess of $CH_4$ gas in the reactor. By so doing, the $H_2O$ and $CO_2$ constituents are reacted to $H_2$ and CO.

The temperature of the entire reduction zone is maintained in the range of from about 2,400 to about 3,000° F. The preferred range is 2,650–2,750° F. Heat may be supplied by the reducing gas, by heat exchange, by indirect heating, and by the heat of reaction. Electrical heating may be used in conjunction with gas heating.

Referring to FIGURE 1, powdered ore of of known size distribution is placed into the hopper 1, of a vibratory screw-feed machine 2, which regulates, by electrical control, the rate of ore flow through a stainless steel discharge tube 3, through the furnace inlet ore tube 4, made of graphite. The discharge tube is jacketed with an electric heater 5, which preheats the ore to 1,000° F. ±25° F. as determined by a thermocouple, not shown, near the discharge end of tube 3. Both tube and hopper also serve as a gas seal when filled with ore.

The preheated ore falls by gravity through the furnace inlet ore tube 4, into a graphite disengager-funnel 6, which serves a threefold function: (a) to funnel the ore into the top of the graphite reduction column 7, (b) to disengage the ore from the suspending and lifting influences of the hot reductant gas entering from the reduction column, and (c) to super-heat the pre-heated ore.

The hot ore particles funneled into the graphite reduction column 7, are immediately met with a stream of hot reductant gas which has been ascending the column with constant deceleration, but still retaining sufficient lifting force to suspend the smaller size particles. Larger particles continue by gravity further down the tapered reduction column 7, until the opposing gas acceleration is sufficient to arrest further fall. The largest particles of ore may reach the bottom of the column but the reducing gas entering through the constant diameter portion of this tube—shown at 8, is at maximum velocity and lifting force to repel any flow of ore through the tube. Thus, the entire reduction column, by virtue of predetermined tapered design, maintains controlled gasiform distribution of the ore throughout, with each particle circulating in turbulent vertical orbits.

Reduction of each particle results in the formation of a corresponding particle of carburized iron, but also a corresponding increase in relative density. As a result of turbulence, metal collisions and agglomeration will occur, increasing both the size and the weight of the droplets, but this only hastens their fallout. Liquid slag particles, although much lighter, will act similarly, except for a smaller amount which will loosely adhere to the hot graphite wall and eventualy run down and out of the reduction column 7. At temperatures around 3,000° F., graphite is not easily wetted by slag or metal. Thus, both metal and slag liquids collect in a heated metal-slag graphite crucible 9, where the iron will settle to the bottom and the slag will float on top of the iron.

To facilitate constant removal of both iron and slag from the crucible without loss of gas or pressure over the slag, the crucible is designed with gas traps using the "underpour" principle. To illustrate, the metal enters a submerged port 10, ascending the vertical bore 11, in the crucible wall, to the top of a graphite iron-tap tube 12, the height of which determines the constant metal height in the crucible. Likewise, the slag enters submerged port 13, into the vertical bore 14, in the crucible wall, to the top of a graphite slag-tap tube 15, the height of which determines the height of slag in the crucible. Thus, any additional slag, coming from the reduction column will increase the slag height, with consequent spillage into the slag-tap tube 15, and gravity flow out of the furnace. In like manner, additional metal spills over into iron-tap tube 12, thence down and out.

The reductant gas is passed through a flow meter (not shown) and enters the furnace at inlet gas port 19, where a pressure gauge is also located (not shown). Another gas port 20, directs the gas flow vertically into the annular, cylindrical space 21, between the graphite reflector tube 22, and the electrical heater unit 23, where it is heated while ascending to the top. At the upper end of the heater unit 24, the gas passes over the heater unit and downwards in the annular, cylindrical space 25, between the electrical heater units 23, and the graphite reaction column 7, for additional heating. At the base of this annular space 25, a series of ports 26, direct the hot gas into the graphite crucible 9, where it again reverses direction and ascends the vertical constant diameter tube 8, within maximum velocity, and continues upwards through the reduction column 7, suspending and reducing the ore.

As noted earlier, the partially spent gas discharges from the reduction column into the disengager funnel 6, where the velocity reaches a minimum. Here it continues to reduce, almost instantly, the finest air-floating ore dust, as well as to super-heat the fresh ore supply. Finally, the spent gas exits at the top of the disengager funnel through the gas discharge tube 27, after which it is cooled, analyzed and converted into useful heat for recycle or other use.

A graphite fluxing tube 28 is provided to pneumatically inject fluxing compounds into the crucible, as well as to introduce preheated methane gas directly into the crucible and into the reducing column to maintain regeneration of the reducing gas. It is fitted with instruments to indicate the gas pressure in the crucible and in the reduction column, by means of a connecting pressure gauge outside the furnace.

The crucible 9 is surrounded with a cylindrical electric heater 29, which is also enclosed by a graphite reflector tube 30. Likewise, a graphite reflector tube 31 surrounds the disengager funnel 6. Adequate insulation 33 fills the space between the reflector tubes 31, 22, and 30 and the pressure-tight steel shell 32.

The crucible heater 29, is electrically controlled to the desired temperature by means of a recording potentiometer actuated by suitably located high temperature thermocouples, not shown. Likewise, the reduction column heater 23, is divided into three units, each with separate electrical controls, not shown, thus permitting sectional temperature control of the entire reduction column 7, by means of the recording potentiometer and suitably located high temperature thermocouples, not shown.

Figure 2:
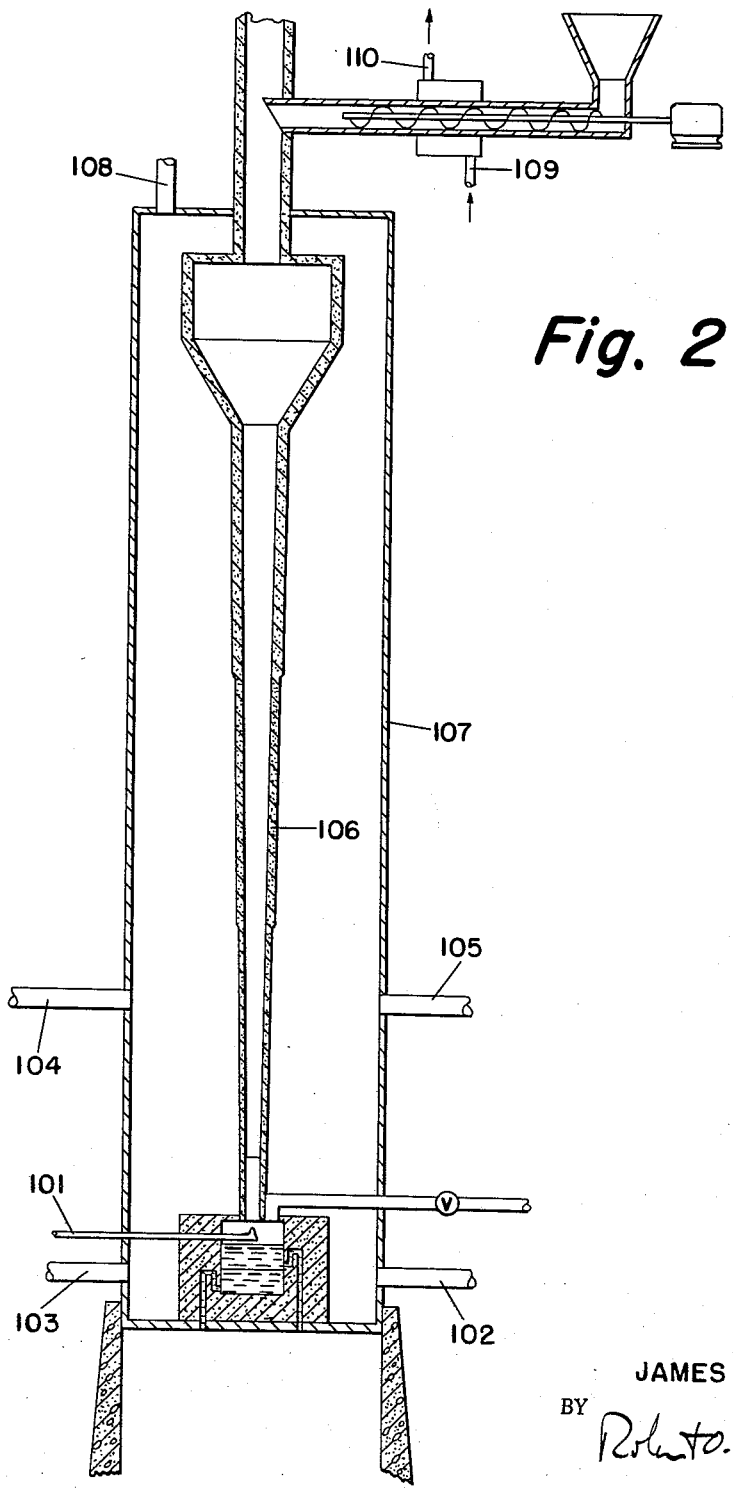

FIGURE 2 discloses an embodiment of the invention in which all heat is supplied by hot gases. Reducing gas is supplied by line 101. This gas may be preheated. Heating gas is fed to lines 102, 103, 104, and 105. This gas is preheated to a temperature of from about 1,500 to about 3,000° F. It heats the area between the reduction tube 106 and the reactor shell 107. Heating gas is removed through line 108. The ore is preheated by passing hot gas through line 109 and removing spent gas through line 110.

I claim:
1. A process for the reduction of iron ore comprising the steps of preheating iron ore having graded particle size distribution, passing the preheated ore through a reduction zone in a vertical downwardly tapered path in contact with graphite and reducing gas and reducing the ore to liquid particulate iron at a temperature in the range of from about 2400 to about 3000° F., while said ore is maintained in oscillating turbulent suspension in upwardly flowing reducing gas, the classification of charged ore particles of varying sizes undergoing reduction being such that the particles of greater size and density are suspended in the bottom area of the reduction zone and below the particles of lesser size and density due to a gradual reduction in gas velocity toward the top of the reduction zone, said liquid particulate iron passing downwardly to a collection zone below the reduction zone by virtue of the increase in relative density effected by reduction and by agglomeration of the liquid iron.

2. The process according to claim 1 in which an excess of free carbon is maintained in the reduction tube.

3. The process according to claim 1 in which the ore ranges in size from 20 to 325 mesh.

4. Apparatus for reducing iron oxides comprising a substantially vertical downwardly tapered graphite reaction tube, means for metering the oxides from a hopper into a disengaging zone in the upper section of the reaction tube, means for injecting gas into the bottom of said tube and egress means at the top thereof, means for collecting the metal product below the reaction tube, and means for removing the product from the collection zone.

5. In a furnace for the reduction of iron ore the combination of a vertically disposed, annular, downwardly tapered, graphite reduction tube, a vertically disposed heat jacket surrounding said tube in spaced relationship thereto, means for metering the iron ore from a hopper through a heated connecting passage between said hopper and the upper zone of said reduction tube, means for passing reducing gas downwardly through the annular space defined by the reduction tube and the heat jacket and then upwardly through the reduction zone, means for collecting metal product below the reaction tube, means for maintaining the liquid level of the metal product constant and an underpour device adapted to convey metal product from the system.

6. Apparatus for reducing iron oxides comprising a substantially vertical conical graphite reduction tube having a ratio of minimum bore diameter to maximum bore diameter in the range of from 1.0 to 1.1 to 1.0 to 4.0 and a ratio of length to minimum bore in the range of from 1 to 25 to 1 to 300, means for metering the oxides from a hopper into a disengaging zone in the upper section of the reaction tube, means for injecting gas into the bottom of said tube and egress means at the top thereof, means for collecting the metal product below the reaction tube, and means for removing the product from the collection zone.

7. In a furnace for the reduction of iron ore, the combination of a vertically disposed, annular, downwardly tapered graphite reduction tube, a vertically disposed heat jacket surrounding said tube in spaced relationship thereto, means for introducing heating gas into the space between the tube and the jacket, egress means for said heating gas, between said heat jacket and said reduction tube, means for metering the iron ore from a hopper through a heated connecting passage between said hopper and the upper zone of said reduction tube, means for passing reducing gas into the bottom of said reduction tube, egress means for spent reducing gas at the top of said reduction tube, means for collecting metal product below the reduction tube, and means for removing the product from the collection zone.

References Cited in the file of this patent

UNITED STATES PATENTS

| | | |
|---|---|---|
| 1,370,915 | Riveroll | Mar. 8, 1921 |
| 2,184,300 | Hodson et al. | Dec. 26, 1939 |
| 2,603,561 | Swan | July 15, 1952 |
| 2,729,556 | Fontana | Jan. 3, 1956 |
| 2,951,756 | Cavanagh | Sept. 6, 1960 |
| 3,053,648 | Stephens | Sept 11, 1962 |